United States Patent
Sakuyama (10) Patent No.: US 9,458,893 B2
(45) Date of Patent: Oct. 4, 2016

(54) CLUTCH APPARATUS FOR VEHICLE

(71) Applicant: HONDA MOTOR CO., LTD., Tokyo (JP)

(72) Inventor: Hisashi Sakuyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 49 days.

(21) Appl. No.: 14/514,578

(22) Filed: Oct. 15, 2014

(65) Prior Publication Data

US 2015/0114784 A1    Apr. 30, 2015

(30) Foreign Application Priority Data

Oct. 24, 2013  (JP) ................................. 2013-221461

(51) Int. Cl.
| | |
|---|---|
| F16D 13/56 | (2006.01) |
| F16D 43/21 | (2006.01) |
| F16D 47/02 | (2006.01) |
| F16D 13/54 | (2006.01) |
| F16D 13/52 | (2006.01) |

(52) U.S. Cl.
CPC ............ *F16D 13/56* (2013.01); *F16D 43/216* (2013.01); *F16D 2013/565* (2013.01)

(58) Field of Classification Search
CPC ...... F16D 13/56; F16D 13/565; F16D 13/54; F16D 13/52; F16D 2013/565; F16D 2127/005; F16D 43/21; F16D 43/216; F16D 47/02

USPC ........................................................ 192/54.1
See application file for complete search history.

(56) References Cited

U.S. PATENT DOCUMENTS

| | | | | |
|---|---|---|---|---|
| 5,617,938 | A * | 4/1997 | Tsukada ................. | F16D 13/52 192/54.5 |
| 7,681,705 | B2 * | 3/2010 | Okada ..................... | F16D 13/04 192/54.5 |
| 8,146,724 | B2 * | 4/2012 | Miyazaki ............... | F16D 13/04 192/54.5 |
| 8,424,662 | B2 * | 4/2013 | Gokan .................... | F16D 13/56 192/113.5 |

FOREIGN PATENT DOCUMENTS

JP    3378100 B2    2/2003

* cited by examiner

*Primary Examiner* — Jacob S Scott
*Assistant Examiner* — Tinh Dang
(74) *Attorney, Agent, or Firm* — Squire Patton Boggs (US) LLP (57) ABSTRACT

A clutch apparatus for a vehicle includes cancel mechanism having a weight member fitted for sliding movement in a clutch hub. The weight member is configured to slidably move in a radial direction of an output power shaft, and has an engaging portion at an inner end portion thereof along the radial direction. An elastic member biases the weight member toward the inner side along the radial direction of the output power shaft. A locking element is formed on the output power shaft or a locking member fixed to the output power shaft, and is configured to be engaged with the engaging portion from the opposite side to a pressure plate.

14 Claims, 8 Drawing Sheets

CLUTCH APPARATUS FOR VEHICLE

BACKGROUND

1. Field

The present invention relates to a clutch apparatus for a vehicle.

2. Description of the Related Art

A multiple-disk clutch provided in a power unit incorporated in a vehicle such as a motorcycle and including a counter torque reduction mechanism and a cancel mechanism is disclosed in and already known from Patent Document 1 (Japanese Patent No. 3378100). The counter clock reduction mechanism moves, when torque from a driving wheel side is inputted, a pressure plate, which cooperates with a pressure receiving plate to sandwich a plurality of driving friction plates and a plurality of driven friction plates therebetween, in a direction in which the pressure plate is spaced away from the pressure receiving plate to suppress torque, which is to be transmitted to an internal combustion engine side, to a low level. The cancel mechanism invalidates the function of the counter torque reduction mechanism in order to transmit torque, which is inputted from a driving wheel side when the vehicle is pushed to move, to the internal combustion engine side.

However, the cancel mechanism disclosed in Patent Document 1 mentioned above is configured such that it includes a rocking cam supported on the pressure receiving plate in such as to be rockable around an axial line parallel to the axial line of the output power shaft. Therefore, the cancel mechanism is liable to have an increased size, and there is the possibility that the multiple-disk clutch may have a size in the axial direction increasing by an amount corresponding to the cancel mechanism provided therefor.

SUMMARY

The present invention has been made in view of such circumstances as described above, and it is an object of the present invention to provide a clutch apparatus for a vehicle which can be prevented from increasing in size even where a cancel mechanism is provided.

In order to achieve the object described above, according to certain embodiments of the present invention, a clutch apparatus for a vehicle includes a clutch outer to which power from an internal combustion engine is inputted. A pressure receiving plate is fixed to an output power shaft, and a driving friction plate is engaged by the clutch outer. A driven friction plate is disposed in an opposing relationship to the driving friction plate, and a pressure plate is disposed so as to cooperate with the pressure receiving plate to sandwich the driving friction plate and the driven friction plate therebetween and is movable in an axial direction of the output power shaft. A clutch hub is disposed between the pressure receiving plate and the pressure plate in a direction along the axial line of the output power shaft for being engaged by the driven friction plate. A counter torque reduction mechanism causes the clutch hub to press the pressure plate in a direction in which the pressure plate is spaced away from the pressure receiving plate in response to an input of rotational power from the output power shaft to the pressure receiving plate. A cancel mechanism invalidates a function of the counter torque reduction mechanism in a state in which a number of rotations of the clutch hub is equal to or lower than a predetermined rotational speed. The cancel mechanism includes a weight member fitted for sliding movement in the clutch hub in such a manner as to be capable of slidably moving in a radial direction of the output power shaft and having an engaging portion at an inner end portion thereof along the radial direction. An elastic member biases the weight member toward the inner side along the radial direction of the output power shaft, and a locking element is formed on the output power shaft or a locking member is fixed to the output power shaft in such a manner as to be capable of being engaged with the engaging portion from the opposite side to the pressure plate.

According to certain embodiments of the present invention, the engaging portion can be formed as an inclined face inclined in such a manner as to be positioned on the pressure plate side toward the outer side along the radial direction of the output power shaft, and the locking element can be formed as a tapering face.

According to certain embodiments of the present invention, the locking member on which the locking element is formed is a thrust washer sandwiched between the pressure receiving plate mounted against relative rotation on the output power shaft at a fixed position in an axial direction of the output power shaft. A nut screwed with the output power shaft.

According to certain embodiments of the present invention, the clutch hub has a sliding hole provided thereon, which extends in the radial direction of the output power shaft and in which the weight member is fitted for sliding movement. A coil spring, which is the elastic member, is disposed in a compressed state between the weight member and a spring receiving member formed as a separate member from the weight member and accommodated at a fixed position in the sliding hole on the outer side with respect to the weight member in the radial direction of the output power shaft. The spring receiving member has a guide shaft portion provided in a projecting manner thereon so as to be inserted into an end portion of the coil spring at the spring receiving member side.

According to certain embodiments of the present invention, the spring receiving member is engaged with a pin mounted on the clutch hub across the sliding hole at the opposite side to the coil spring with respect to the spring receiving member.

According to certain embodiments of the present invention, the clutch hub integrally has a plurality of spoke portions extending radially in an opposing relationship to the pressure receiving plate, and the weight member is fitted for sliding movement with a side face of a selected one spoke portion of the plurality of spoke portions at the opposite side to the pressure receiving plate.

In certain embodiments, the cancel mechanism is configured such that the engaging portion at the inner end portion of the weight member fitted for sliding movement in the clutch hub in such a manner as to be capable of slidably moving in the radial direction of the output power shaft and biased toward the inner side along the radial direction by the elastic member is engaged with the locking element, which is formed on the output power shaft or the locking member fixed to the output power shaft, from the opposite side to the pressure plate in a state in which centrifugal force acting upon the weight member is low, namely, in a low rotational speed state of the clutch hub, to restrict movement of the clutch hub in the direction in which the pressure plate is pressed. Thus, while the cancel mechanism is configured compact, it is possible to prevent increase of the size of the clutch mechanism in the axial direction and apply, when the vehicle is to be pushed to move, counter-torque to the output power shaft to start up the internal combustion engine.

In certain embodiments, the engaging portion in the form of an inclined face is engaged with the locking element in the form of a tapering face. Therefore, even if the engaging portion and the locking portion wear out by friction, since the weight member of a wedge shape moves, the engagement of the engaging portion with the locking portion can be achieved for a long period of time and the durability of the cancel mechanism can be enhanced.

In certain embodiments, the locking member is formed as a thrust washer. Therefore, the necessity for provision of a locking member for exclusive use on the cancel mechanism can be eliminated and the number of parts can be reduced. Further, when the locking portion is abraded, it is only necessary to exchange the thrust washer, and consequently, superior maintainability can be anticipated.

In certain embodiments, the clutch apparatus for a vehicle is configured such that the weight member, coil spring and spring receiving member are mounted in a juxtaposed relationship with each other in a radial direction on the clutch hub. Therefore, a more compact configuration of the cancel mechanism can be anticipated.

In certain embodiments, the spring receiving member is engaged with the pin mounted on the clutch hub across the sliding hole to restrict movement of the spring receiving member. Therefore, upon assembly, the weight member, coil spring, spring receiving member and pin may be assembled in order to the clutch hub. Consequently, the ease of assembly can be enhanced.

Further, with the sixth characteristic of the present invention, the weight member is fitted for sliding movement with the side face of the selected one of the plurality of spoke portions extending radially at the opposite side to the pressure receiving plate. Therefore, a dead space formed between the pressure plate and the clutch hub can be utilized effectively to dispose the cancel mechanism.

DETAILED DESCRIPTION

Figure 1:
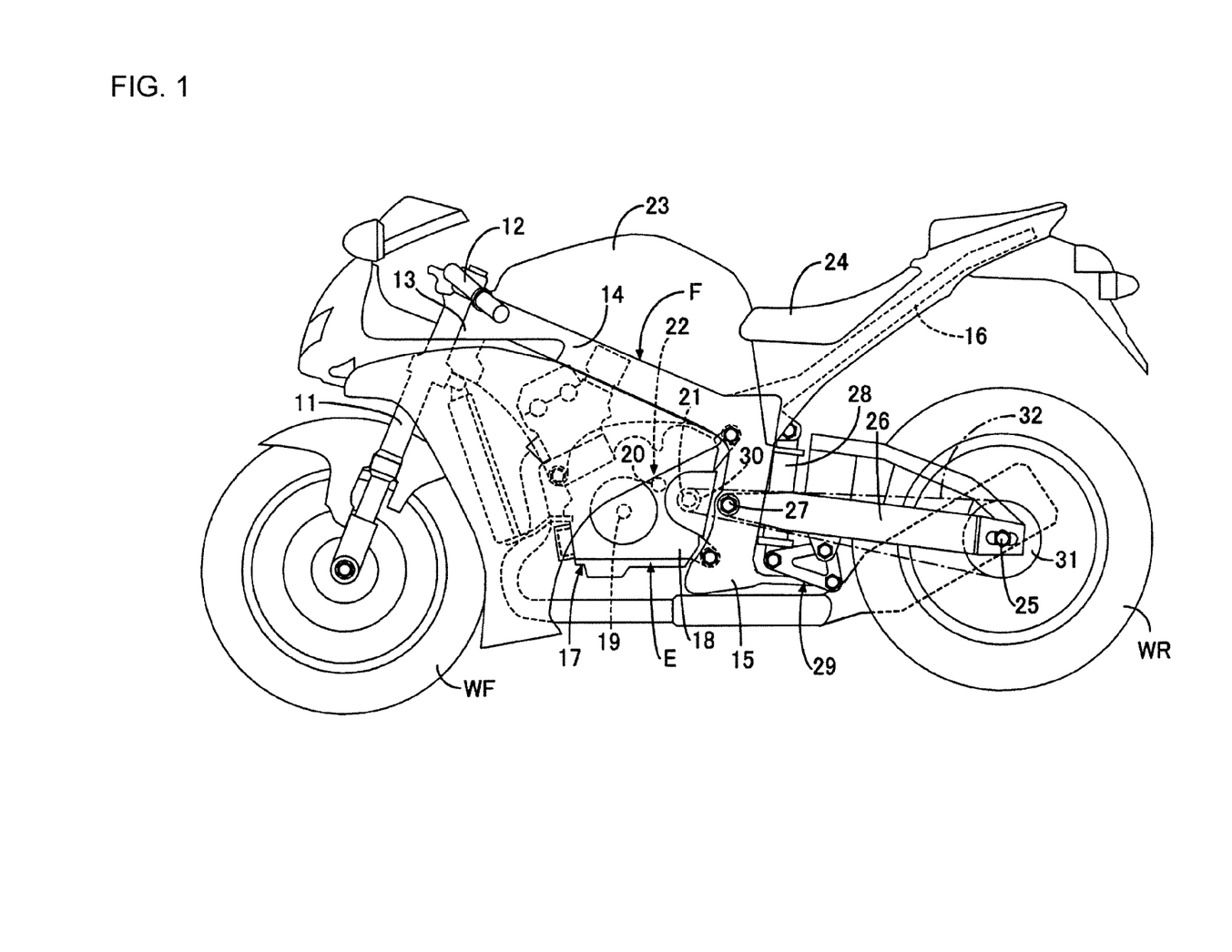
FIG. 1 is a left side elevational view of a motorcycle.

Embodiments of the present invention are described with reference to FIGS. 1 to 8 of the accompanying drawings. Referring to FIG. 1, a vehicle body frame F of a motorcycle includes a head pipe 13, a pair of left and right main frames 14, a pair of left and right pivot frames 15, and a pair of left and right seat rails 16. The head pipe 13 supports a front fork 11, which supports a front wheel WF for rotation thereon, and a steering handlebar 12 for steering movement. The main frames 14 extend rearwardly downwardly from the head pipe 13. The pivot frames 15 are integrally connected to rear end portions of the main frames 14 and extend downwardly. The seat rails 16 are connected to rear end portions of the main frames 14 and extend rearwardly upwardly. An internal combustion engine E is mounted on the vehicle body frame F and includes an engine main body 17 disposed below the main frames 14 in front of the pivot frames 15. A crankcase 18 configures part of the engine main body 17 and has a gear transmission 22 accommodated therein. The gear transmission 22 includes a main shaft 20 and a countershaft 21 which extend in parallel to a crankshaft 19 which is supported for rotation on the crankcase 18 and has an axial line in a vehicle widthwise direction.

A fuel tank 23 is mounted on the main frames 14 and disposed above the engine main body 17. A rider's seat 24 is disposed behind the fuel tank 23.

A swing arm 26 is supported at a front end portion thereof for upward and downward rocking motion on the pivot frames 15 through a support shaft 27 and supports, at a rear end portion thereof, an axle 25 of a rear wheel WR for rotation thereon. A rear cushion unit 28 is connected at an upper end portion thereof to a rear end portion of the main frames 14 and is connected at a lower end portion thereof to a lower portion of the swing arm 26 at an intermediate location in a forward and rearward direction through a link 29.

A driving sprocket wheel 30 is fixed to the countershaft 21 of the gear transmission 22 at the left side of the crankcase 18. A drive chain 32 extends between and around a driven sprocket wheel 31 fixed to the axle 25 of the rear wheel WR and the driving sprocket wheel 30.

Figure 2:
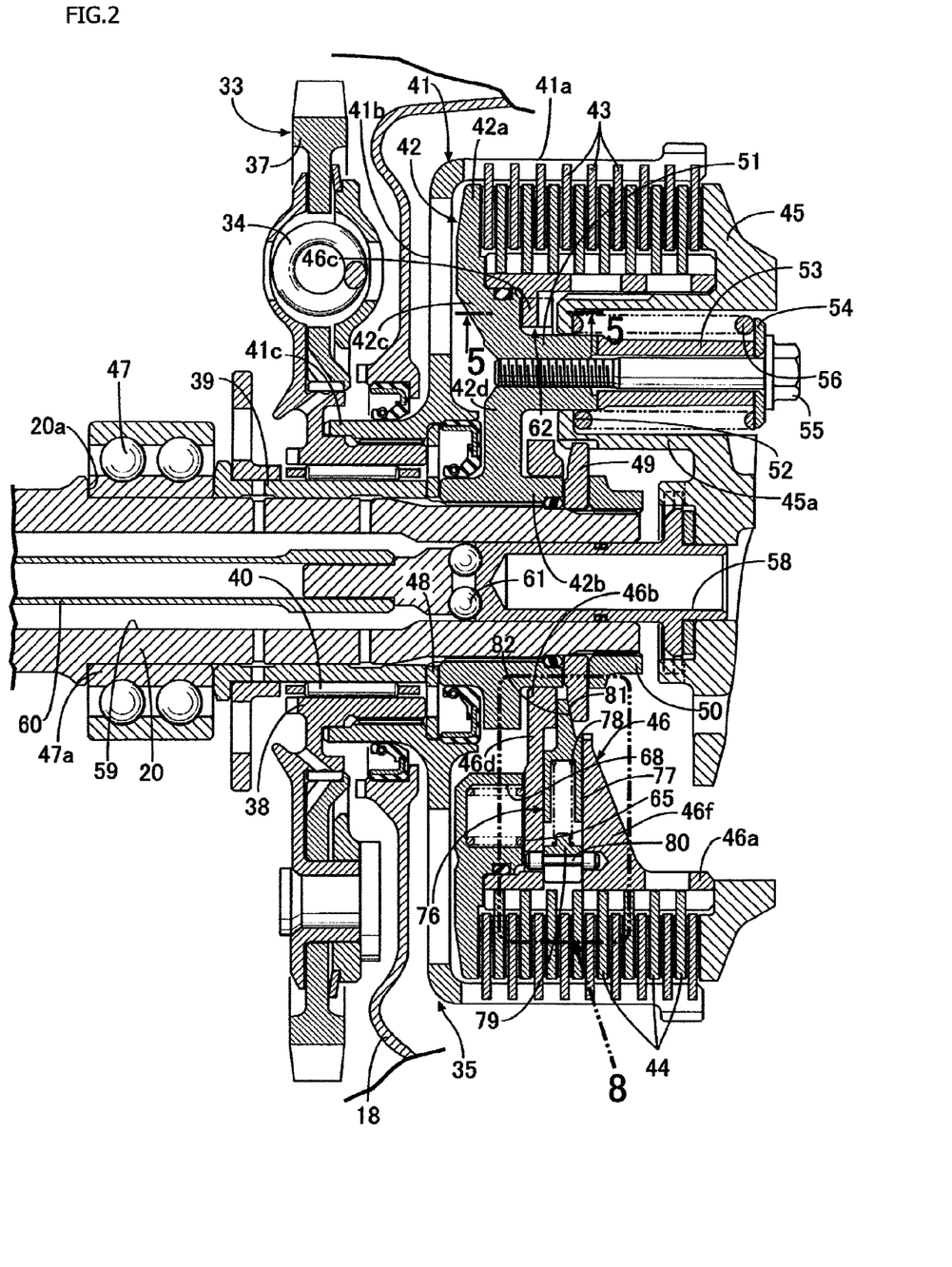
FIG. 2 is a vertical cross sectional view of a clutch apparatus.

Referring to FIG. 2, a primary gear reduction mechanism 33, a damper spring 34 and a clutch apparatus 35 according to embodiments of the present invention are interposed between the crankshaft 19 and the main shaft 20 of the gear transmission 22.

The primary gear reduction mechanism 33 includes a primary driving gear (not depicted) provided on the crankshaft 19 and a primary driven gear 37 meshing with the primary driving gear. A transmission member 38 is supported for rotation on a cylindrical sleeve 39, which coaxially surrounds the main shaft 20, through a needle bearing 40. The transmission member 38 is connected to the primary driven gear 37 through the damper spring 34.

The clutch apparatus 35 includes a clutch outer 41, a pressure receiving plate 42, a plurality of driving friction plates 43, a plurality of driven friction plates 44, a pressure plate 45, and a clutch hub 46. The clutch outer 41 receives power inputted thereto from the internal combustion engine E. The pressure receiving plate 42 is fixed to the main shaft 20 which is an output power shaft capable of transmitting the power to the rear wheel WR. The driving friction plates 43 are juxtaposed in a direction of an axial line of the main shaft 20 and held in engagement with the clutch outer 41. The driven friction plates 44 are disposed between the driving friction plates 43 in an opposing relationship to the driving friction plates 43. The pressure plate 45 is disposed such that it cooperates with the pressure receiving plate 42 to sandwich the driving friction plates 43 and the driven friction plates 44 therebetween and is movable in an axial direction of the main shaft 20. The clutch hub 46 is disposed between the pressure receiving plate 42 and the pressure plate 45 and held in engagement with the driven friction plates 44.

The clutch outer 41 integrally has a cylindrical portion 41a, an end wall portion 41b and a connecting cylindrical portion 41c. The end wall portion 41b connects to an end portion of the cylindrical portion 41a on the primary driven gear 37 side. The connecting cylindrical portion 41c coaxially connects to a central portion of the end wall portion 41b and extends liquid-tight through the crankcase 18. The connecting cylindrical portion 41c is spline-coupled to the transmission member 38 such that the direction thereof along the axial line of the main shaft 20 is fixed. The driving friction plates 43 are engaged at an outer circumferential portion thereof with the cylindrical portion 41*a* in such a manner as to allow movement thereof in the axial direction but inhibit relative rotation thereof.

Figure 3:
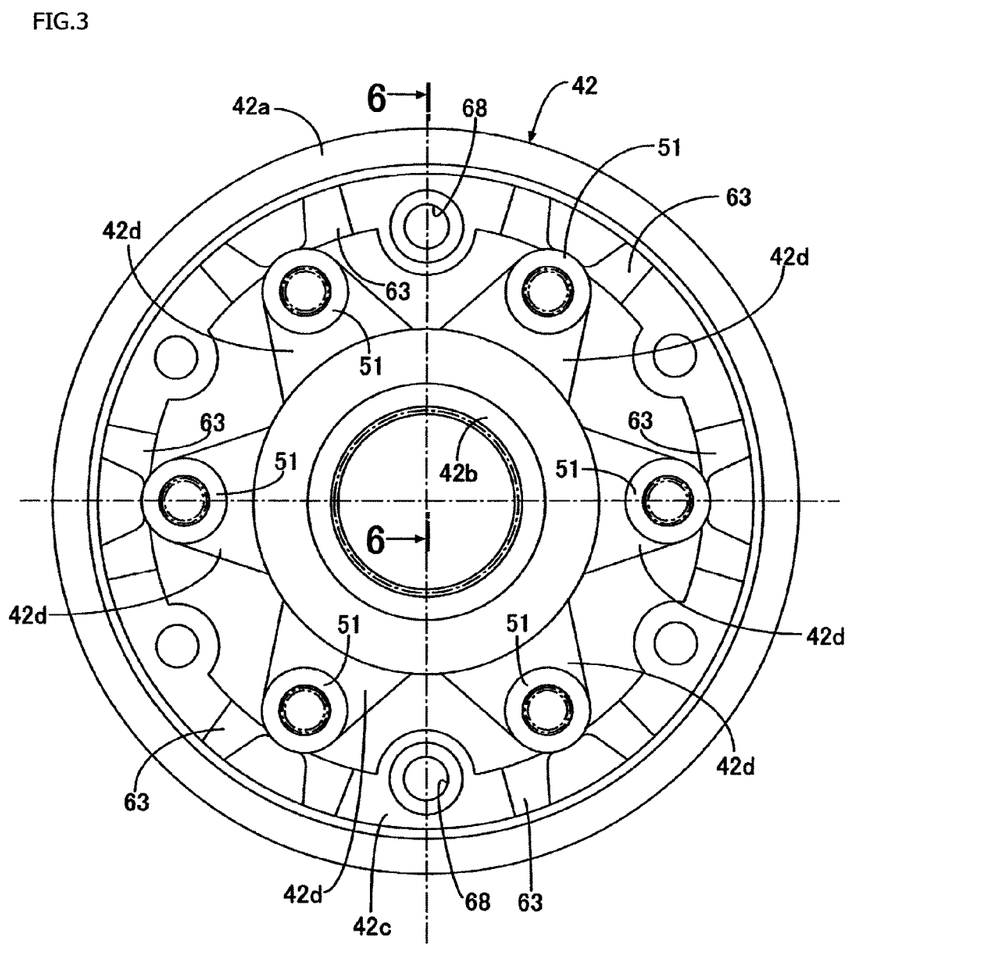
FIG. 3 is a front elevational view of a pressure receiving plate.

Referring also to FIG. 3, the pressure receiving plate 42 integrally has a pressure receiving plate portion 42*a* in the form of a ring plate, a cylindrical boss portion 42*b*, an annular flange portion 42*c* and a plurality of, for example, six, spoke portions 42*d*. The pressure receiving plate portion 42*a* is opposed to the driving friction plates 43 disposed at one end from among the driving friction plates 43 and driven friction plates 44, which overlap with each other, from the end wall portion 41*b* side of the clutch outer 41. The boss portion 42*b* is spline-coupled to the main shaft 20. The annular flange portion 42*c* protrudes in a radially inner direction from an inner periphery of the pressure receiving plate portion 42*a*. The spoke portions 42*d* radially connect the annular flange portion 42*c* and the boss portion 42*b* to each other.

An annular stepped portion 20*a* is formed on the main shaft 20 such that an inner ring 47*a* provided on a ball bearing 47 interposed between the main shaft 20 and the crankcase 18 abuts at one end thereof with the annular stepped portion 20*a*. The boss portion 42*b* abuts at one end thereof with a first thrust washer 48, which cooperates with the other end of the inner ring 47*a* to sandwich the sleeve 39 therebetween. A nut 50 meshes with the main shaft 20 such that it cooperates with the other end of the boss portion 42*b* to sandwich a second thrust washer 49 therebetween. The nut 50 is tightened to fix the boss portion 42*b*, namely, the pressure receiving plate 42, to the main shaft 20.

Figure 4:
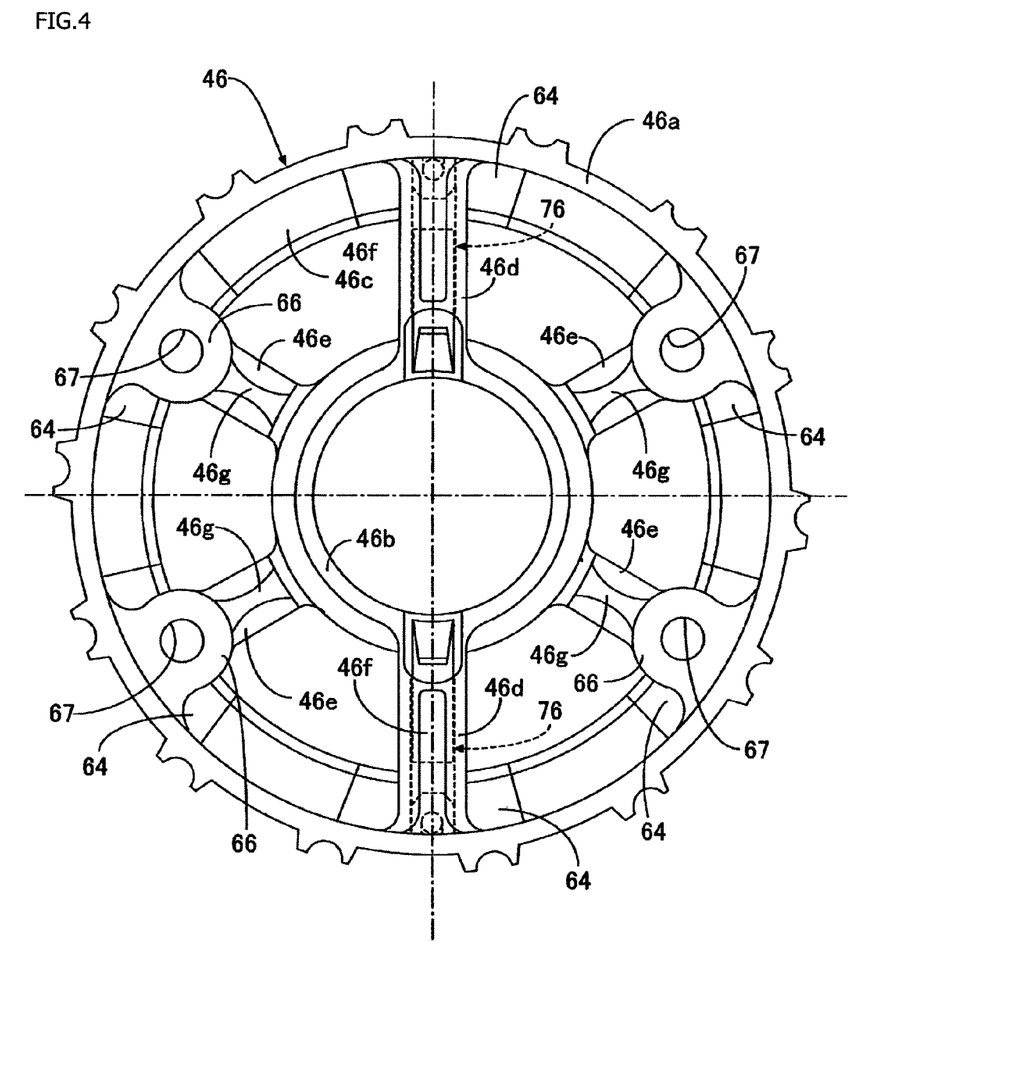
FIG. 4 is a front elevational view of a clutch hub.

Referring also to FIG. 4, the clutch hub 46 is formed such that it integrally has an outer side cylindrical portion 46*a*, an inner side cylindrical portion 46*b*, an annular flange portion 46*c*, a pair of spoke portions 46*d*, four spoke portions 46*e*, ribs 46*f*, and ribs 46*g*. The outer side cylindrical portion 46*a* is engaged at an outer periphery thereof with the driven friction plates 44. The inner side cylindrical portion 46*b* is disposed in and coaxially with the outer side cylindrical portion 46*a* and coaxially surrounds the main shaft 20. The annular flange portion 46*c* protrudes in a radially inner direction from an inner periphery of the outer side cylindrical portion 46*a*. The spoke portions 46*d* are disposed on one diametrical line of the outer side cylindrical portion 46*a* and the inner side cylindrical portion 46*b* in such a manner as to extend radially and tie the outer side cylindrical portion 46*a* and the inner side cylindrical portion 46*b* with each other. The ribs 46*f* are provided continuously on an inner periphery of the outer side cylindrical portion 46*a* in such a manner as to project from a side face of the spoke portions 46*d* on the opposite side to the pressure receiving plate 42. The ribs 46*g* are provided continuously on an inner periphery of the outer side cylindrical portion 46*a* in such a manner as to project from a side face of the spoke portions 46*e* on the opposite side to the pressure receiving plate 42. The spoke portions 46*d* and 46*e* are disposed in an equidistantly spaced relationship from each other.

Referring back to FIG. 2, the pressure plate 45 is disposed in such a manner as to cooperate with the pressure receiving plate 42 to sandwich therebetween the driving friction plates 43 and the driven friction plates 44, which overlap with each other, and the clutch hub 46 in a direction along the axial line of the main shaft 20. A boss 51 is provided integrally in a projecting manner on the pressure plate 45 at each of the six locations of the spoke portions 42*d* of the pressure receiving plate 42 spaced by an equal distance from each other in a circumferential direction and extends through the clutch hub 46 in the axial direction. Spring holding tubes 45*a* are provided integrally on the pressure plate 45 and coaxially surround the bosses 51, and a spring seat 52 is formed at an end portion of each of the spring holding tube 45*a* at the side at which the spring holding tube 45*a* neighbors with the clutch hub 46. Meanwhile, supporting tubes 53 abut at one end thereof with an end portion of the bosses 51, and spring seats 54 abut with the other end of the supporting tubes 53 and cooperate with the bosses 51 to sandwich the supporting tubes 53 therebetween. Further, bolts 55 extend through the spring seats 54 and the supporting tubes 53 and are screwed in the bosses 51. Coiled main coil springs 56 are provided in a compressed state between the spring seats 54 and the spring seats 52 and surround part of the bosses 51 and the supporting tubes 53.

The main coil springs 56 exert spring force for biasing the pressure plate 45 in a direction toward the pressure receiving plate 42. The pressure plate 45 cooperates with the pressure receiving plate portion 42*a* of the pressure receiving plate 42 under the spring force of the main coil springs 56 to sandwich the driving friction plates 43 and the driven friction plates 44 therebetween to place the internal combustion engine E and the main shaft 20 into a coupled state.

A release plunger 58 is connected coaxially to a central portion of the pressure plate 45, and part of the release plunger 58 is fitted for sliding movement in a shaft hole 59 provided coaxially in the main shaft 20. Further, a release rod 60 is fitted for movement in an axial direction in the shaft hole 59 and is provided continuously to the release plunger 58 through a thrust bearing 61. Accordingly, the release plunger 58 is pressed through the release rod 60 to retract the pressure plate 45 so as to be spaced away from the pressure receiving plate 42 against the spring force of the main coil springs 56 so that the power transmission between the internal combustion engine E and the main shaft 20 can be cut off.

Figure 5:
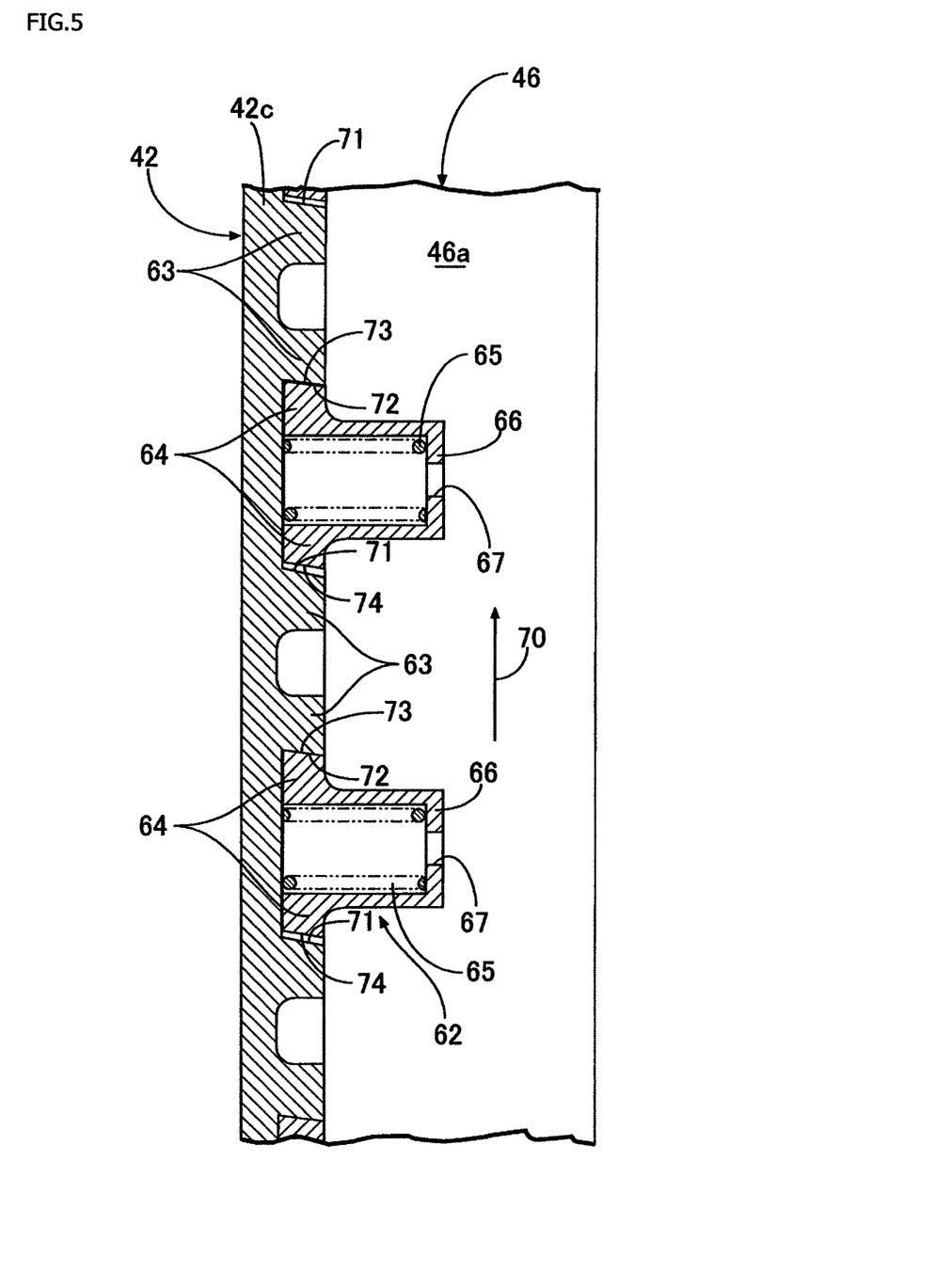
FIG. 5 is a sectional view taken along line 5-5 of FIG. 2.

Referring also to FIG. 5, the clutch apparatus 35 includes a counter torque reduction mechanism 62. The counter torque reduction mechanism 62 is configured such that the pressure plate 45 is pressed by the clutch hub in a direction in which the pressure plate 45 is spaced away from the pressure receiving plate 42 in response to an input of counter torque from the main shaft 20 to the pressure receiving plate 42 when the clutch apparatus 35 is in a connected state. The counter torque reduction mechanism 62 thereby decrease the counter torque to be transmitted to the internal combustion engine E side.

The counter torque reduction mechanism 62 is configured from pressure receiving plate side cams 63, clutch hub side cams 64, and a plurality of auxiliary coil springs 65. The pressure receiving plate side cams are formed integrally on the annular flange portion 42*c* of the pressure receiving plate 42 at locations of the pressure receiving plate 42 corresponding to the spoke portions 42*d*. The clutch hub side cams 64 are formed integrally on the annular flange portion 46*c* at locations of the clutch hub 46 corresponding to the spoke portions 46*d* and 46*e*. The auxiliary coil springs 65 are provided in a compressed state between the pressure receiving plate 42 and the clutch hub 46 and have a spring load lower than that of the main coil springs 56.

At each of continuing portions between the four spoke portions 46*e* and the annular flange portion 46*c* provided on the clutch hub 46, a spring accommodating tubular portion 66 of a bottomed cylindrical shape open to the pressure receiving plate 42 side is provided integrally such that it projects to the opposite side to the pressure receiving plate 42 from the corresponding continuing portion described hereinabove. In the spring accommodating tubular portion 66, the auxiliary coil spring 65 provided in a compressed state between the pressure receiving plate 42 and the clutch hub 46 is accommodated. A through-hole 67 is provided in a closed end wall of the spring accommodating tubular portion 66 at the opposite side to the pressure receiving plate 42.

Figure 6:
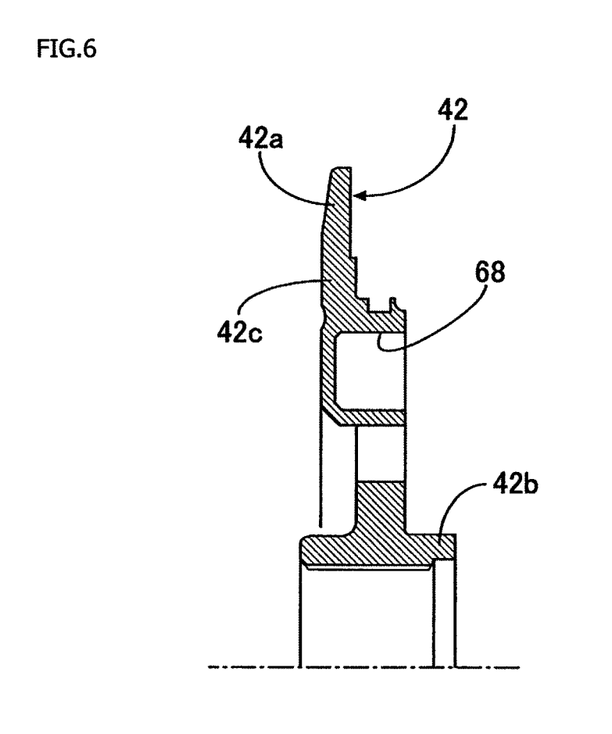
FIG. 6 is a sectional view taken along line 6-6 of FIG. 3.

Referring to FIGS. 2 and 6, the spring accommodating tubular portion 66 is not provided at continuing portions between the two spoke portions 46d and annular flange portion 46c provided on the clutch hub 46, but spring accommodating recessed portions 68 are provided on the pressure receiving plate 42 at locations corresponding to the spoke portions 46d. Further, in the spring accommodating recessed portions 68, the auxiliary coil springs 65 provided in a compressed form between the pressure receiving plate 42 and the clutch hub 46 are accommodated.

The pressure receiving plate side cams 63 are formed integrally on the annular flange portion 42c of the pressure receiving plate 42 at locations corresponding to the six spoke portions 42d provided on the pressure receiving plate 42. The pressure receiving plate side cams 63 project from the annular flange portion 42c in such a manner as to project in a direction same as the projecting direction of the bosses 51. A pressure receiving plate side first cam face 71 is formed on a front face of each of the pressure receiving plate side cams 63 which extends along a rotational direction 70 in FIG. 5 when the direction of rotation of the clutch hub 46 while power is being transmitted from the primary driven gear 37 to the main shaft 20 is a direction indicated by the rotational direction 70. The pressure receiving plate side first cam face 71 is inclined such that it is positioned rearwardly along the rotational direction 70 toward the tip end side. A pressure receiving plate side second cam face 72 is formed on a rear face of each of the pressure receiving plate side cams 63 which extends along the rotational direction 70 such that it is inclined such that it is positioned forwardly along the rotational direction 70 toward the tip end side.

The clutch hub side cams 64 are formed integrally on the annular tubular portion 46c of the clutch hub 46 in such a manner as to project to the pressure receiving plate 42 side while they extend to the opposite sides in a circumferential direction from the continuing portions of the spoke portions 46d and 46e of the clutch hub 46. A clutch hub side first cam face 73 is formed on a front face of each of the clutch hub side cams 64 which extends along the rotational direction 70 and is inclined in such a manner as to be positioned rearwardly along the rotational direction 70 toward the tip end side. A clutch hub side second cam face 74 is formed on a rear face of each of the clutch hub side cams 64 which extends along the rotational direction 70 and is inclined such that it is positioned forwardly along the rotational direction 70 toward the tip end side.

If a torque variation to the acceleration side appears in a torque transmission state between the primary driven gear 37 and the main shaft 20, then the clutch hub side first cam faces 73 are brought into abutment with the pressure receiving plate side second cam faces 72 to generate a relative angular displacement between the clutch hub 46 and the pressure receiving plate 42 such that the clutch hub side second cam faces 74 of the clutch hub side cams 64 are spaced away from the pressure receiving plate side second cam faces 72. Thereupon, the clutch hub 46 moves so as to compress the auxiliary coil spring 65 to reduce the biasing force in the reverse direction by which the biasing force of the main coil springs 56 has been cancelled thereby to allow the biasing force by the main coil springs 56 to be exhibited fully to raise the biasing force.

Figure 7:
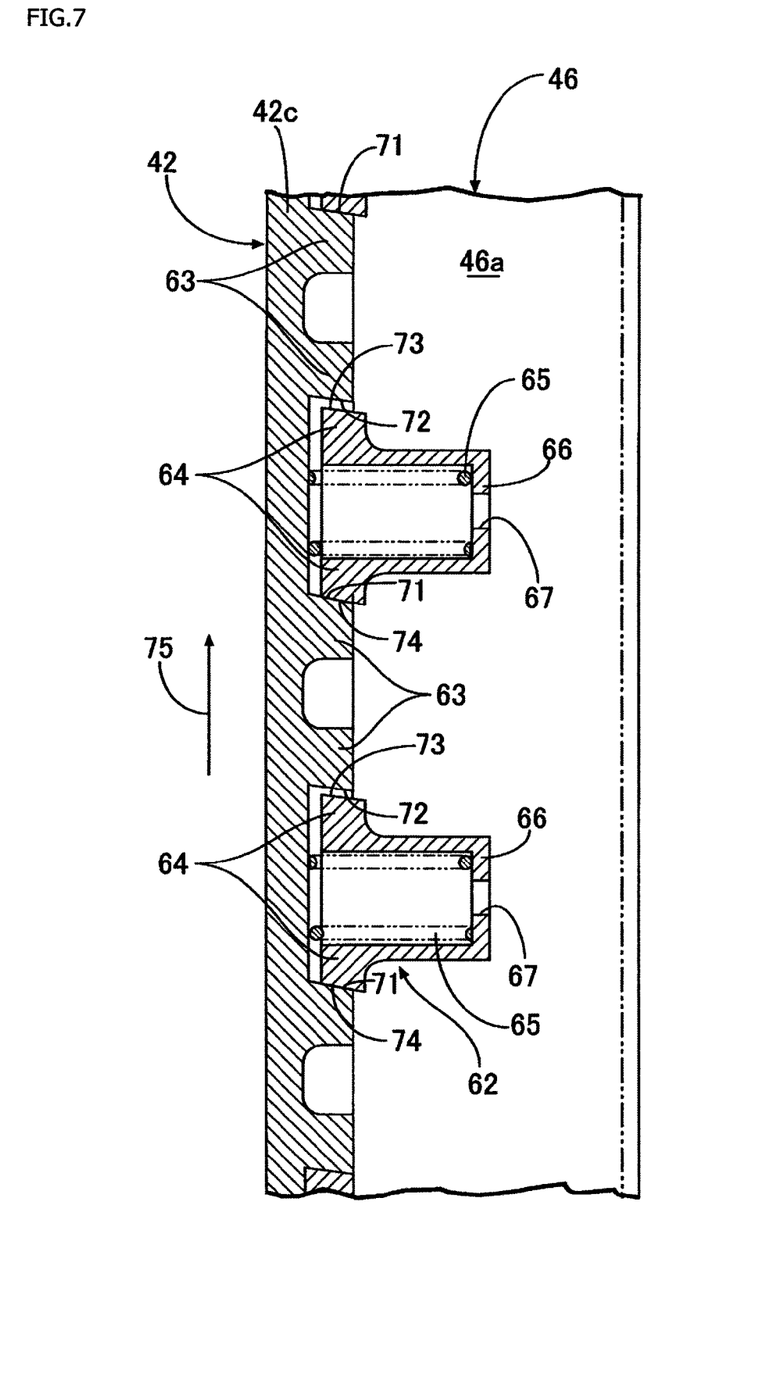
FIG. 7 is a sectional view corresponding to FIG. 5 but in a state in which counter torque acts.

If a torque variation to the deceleration side appears in a torque transmission state between the primary driven gear 37 and the main shaft 20, then counter torque indicated by an arrow mark 75 in the reverse direction to the rotational direction 70 acts upon the pressure receiving plate 42 as depicted in FIG. 7. Consequently, the pressure receiving plate side first cam faces 71 are brought into abutment with the clutch hub side second cam faces 74 to generate a relative angular displacement between the pressure receiving plate 42 and the clutch hub 46 such that the clutch hub side first cam face 73 is spaced away from the pressure receiving plate side second cam face 72. Thereupon, the clutch hub 46 is pushed to move in a direction in which the pressing force between the driving friction plates 43 and the driven friction plates 44 decreases so that the clutch hub 46 is spaced away from the pressure receiving plate 42 from a position indicated by a chain line to another position indicated by a solid line in FIG. 7.

Figure 8:
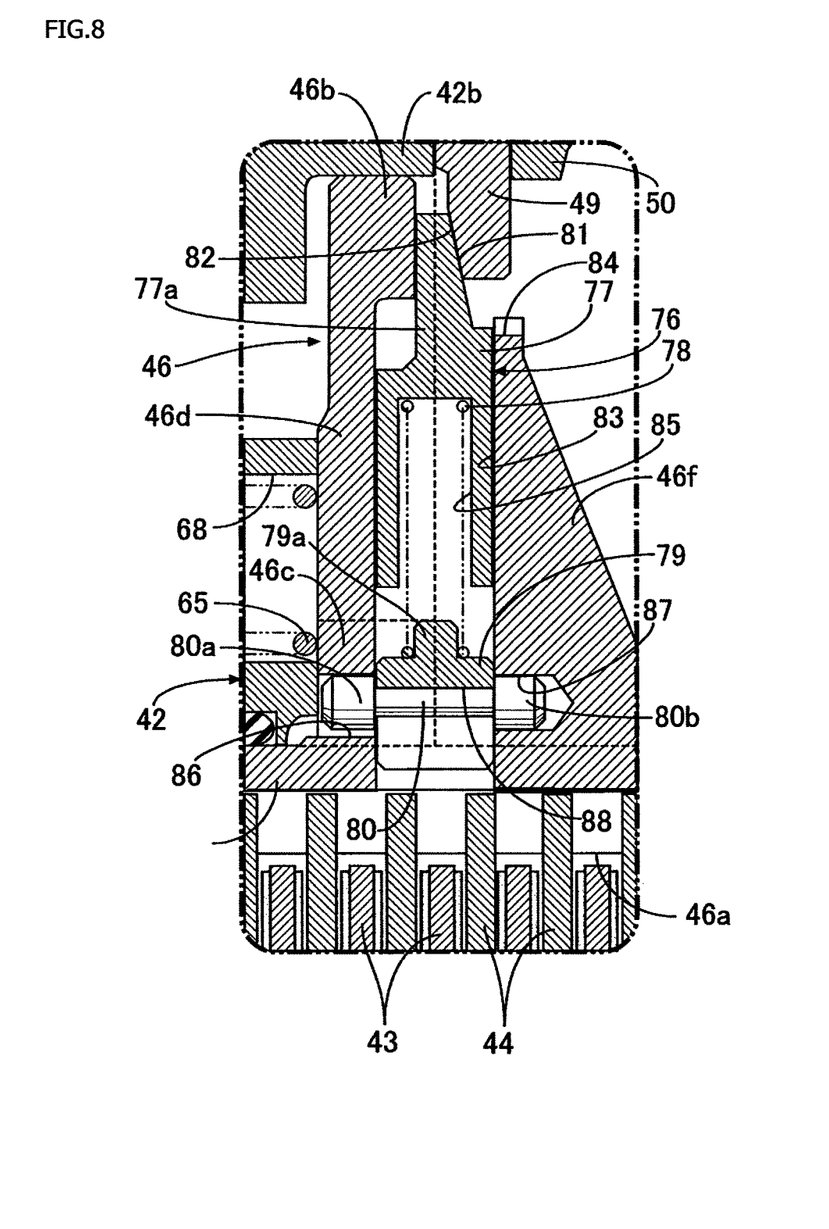
FIG. 8 is an enlarged view of a portion indication by an arrow mark 8 in FIG. 2.

Referring also to FIG. 8, the clutch apparatus 35 includes a cancel mechanism 76 which invalidates the function of the counter torque reduction mechanism 62 in a state in which the number of rotations of the clutch hub 46 is equal to or lower than a predetermined number of rotations. The cancel mechanism 76 includes a weight member 77, a coil spring 78 and a locking portion 82. The weight member 77 is fitted for sliding movement in the clutch hub 46 in such a manner as to be capable of slidably moving in a radial direction of the main shaft 20 and has an engaging portion 81 at an inner end portion along the radial direction. The coil spring 78 is an elastic member for biasing the weight member 77 toward the inner side along the radial direction of the main shaft 20. The locking portion 82 is formed on the main shaft 20 or a locking member fixed to the main shaft 20 such that the engaging portion 81 can be engaged with the locking portion 82 from the opposite side to the pressure plate 45. In certain embodiments, the locking member includes the pressure receiving plate 42 mounted against relative rotation on the main shaft 20 with the position thereof fixed in the axial direction and the second thrust washer 49 sandwiched between the pressure receiving plate 42 and the nut 50 screwed on the main shaft 20. The weight members 77 are fitted for sliding movement in the pair of spoke portions 46d disposed on one diametrical line of the main shaft 20 from between the spoke portions 46d and 46e provided on the clutch hub 46.

Each weight member 77 integrally has a protrusion 77a having a tip end portion opposed to an outer periphery of a side face of the second thrust washer 49 at the opposite side to the nut 50. The engaging portion 81 facing the pressure plate 45 side is formed at a tip end portion of the protrusion 77a. The engaging portion 81 is formed as an inclined face inclined such that it is positioned to the pressure plate 45 side toward the outer side along the radial direction of the main shaft 20. Further, the locking portion 82 is formed as a tapering face on an outer circumferential portion of the second thrust washer 49 while facing the opposite side to the pressure plate 45.

A sliding hole 83 is provided in the clutch hub 46 in such a manner as to extend in a radial direction of the main shaft 20, and the weight member 77 is fitted for sliding movement in the sliding hole 83. The coil spring 78 is provided in a compressed state between the weight member 77 and a spring receiving member 79. The spring receiving member 79 is formed as a separate member from the weight member 77 such that it is accommodated in the sliding hole 83 on the outer side with respect to the weight member 77 in the radial direction of the main shaft 20 and is positioned at a fixed position in the sliding hole 83.

A recessed portion 85 is formed on the weight member 77 and is open to the spring receiving member 79 side. One end portion of the coil spring 78 on the weight member 77 side is accommodated in the recessed portion 85 and abuts with the weight member 77. Meanwhile, the spring receiving member 79 with which the other end portion of the coil spring 78 abuts has a guide shaft portion 79a provided in a projecting manner. The guide shaft portion 79a is inserted in an end portion of the coil spring 78 at the spring receiving member 79 side.

The weight member 77 is fitted for sliding movement on the face of the spoke portion 46d on the opposite side to the pressure receiving plate 42. The sliding hole 83 is formed so as to extend along a radial direction of the clutch hub 46 while spanning the spoke portion 46d and the rib 46f in an axial direction of the clutch hub 46. The sliding hole 83 is open at an outer end thereof to the outer side of the outer side cylindrical portion 46a of the clutch hub 46. Meanwhile, a cutout portion 84 is provided at an inner end portion of the spoke portion 46d and the rib 46f in a radial direction of the clutch hub 46 and allows an inner end portion of the sliding hole 83 to be exposed therethrough. The protrusion 77a of the weight member 77 fitted for sliding movement in the sliding hole 83 projects from the cutout portion 84 to the second thrust washer 49 side.

The spring receiving member 79 is engaged with a pin 80 which is attached to the clutch hub 46 across the sliding hole 83 at the opposite side to the coil spring 78 with respect to the spring receiving member 79. In particular, the pin 80 is formed such that it has increased diameter portions 80a and 80b at the opposite ends thereof. In the annular flange portion 46c, a fitting hole 86 and an insertion hole 87 are provided coaxially across the sliding hole 83. The fitting hole 86 is open to a side face of the annular flange portion 46c at the pressure receiving plate 42 side such that the increased diameter portion 80a is inserted in the fitting hole 86. The insertion hole 87 is formed with a diameter equal to that of the fitting hole 86 such that the increased diameter portion 80b is inserted in the insertion hole 87. In a state in which the increased diameter portion 80a is inserted in the fitting hole 86 and the increased diameter portion 80b is inserted in the insertion hole 87, the pin 80 is engaged with a locking recessed portion 88 provided on the spring receiving member 79 on the opposite side to the coil spring 78. Further, coming off of the pin 80 from the clutch hub 46 is prevented by the pressure receiving plate 42.

Now, action of certain embodiments is described. The function of the counter torque reduction mechanism 62 which presses, by the clutch hub 46 thereof, the pressure plate 45 in a direction in which the pressure plate 45 is spaced away from the pressure receiving plate 42 in response to an input of rotating power from the main shaft 20 to the pressure receiving plate 42 is invalidated by the cancel mechanism 76 in a state in which the number of rotations of the clutch hub 46 is equal to or lower than the predetermined number of rotations. The cancel mechanism 76 includes the weight member 77, coil spring 78 and locking portion 82. The weight member 77 is fitted for sliding movement in the clutch hub 46 such that it can slidably move in the radial direction of the main shaft 20. The weight member 77 has the engaging portion 81 at an inner end portion thereof along the radial direction. The coil spring 78 biases the weight member 77 inwardly in a radial direction of the main shaft 20. The locking portion 82 is formed on the second thrust washer 49 which is a locking member fixed to the main shaft 20 such that it allows the engaging portion 81 to engage from the opposite side to the pressure plate 45. The engaging portion 81 at the inner end portion of the weight member 77 is engaged with the locking portion 82 of the second thrust washer 49 in a state in which the centrifugal force acting on the weight member 77 is low, namely, in a state in which the number of rotations of the clutch hub 46 is low, to restrict movement of the clutch hub 46 in a direction in which the pressure plate 45 is pressed. Therefore, while the cancel mechanism 76 is configured compact, it is possible to avoid increase of the size of the clutch apparatus 35 in the axial direction and provide, when the vehicle is pushed to move or in a like case, counter torque to the main shaft 20 to start up the internal combustion engine E.

The engaging portion 81 is formed as an inclined face inclined such that it is positioned to the pressure plate 45 side toward the outer side along the radial direction of the main shaft 20, and the locking portion 82 is formed as a tapering face as described hereinabove. Therefore, even if the engaging portion 81 and the locking portion 82 wear out by friction, the weight member 77 of a wedge shape moves. Consequently, the engagement of the engaging portion 81 with the locking portion 82 can be achieved for a long period of time and the durability of the cancel mechanism 76 can be enhanced.

Further, the locking portion 82 is formed on the second thrust washer 49 sandwiched between the pressure receiving plate 42 mounted against relative rotation and positioned at a fixed position of the main shaft 20 in the axial direction and the nut 50 screwed on the main shaft 20. Therefore, the necessity for provision of a locking member for exclusive use on the cancel mechanism 76 can be eliminated and the number of parts can be reduced. Further, when the locking portion 82 is abraded, only it is necessary to exchange the second thrust washer 49, and consequently, superior maintainability can be anticipated.

Further, the sliding hole 83 in which the weight member 77 is fitted for sliding movement provided on the clutch hub 46 and extends in a radial direction of the main shaft 20. Further, the coil spring 78 is sandwiched in a compressed state between the weight member 77 and the spring receiving member 79 formed as a separate member from the weight member 77 in such a manner as to be accommodated in the sliding hole 83 at the outer side with respect to the weight member 77 in a radial direction of the main shaft 20 and positioned at a fixed position in the sliding hole 83. Furthermore, the guide shaft portion 79a which is inserted in an end portion of the coil spring 78 at the spring receiving member 79 side is provided in a projecting manner on the spring receiving member 79. Therefore, the weight member 77, coil spring 78 and spring receiving member 79 are attached in a juxtaposed relationship with each other in a radial direction on the clutch hub 46, and consequently, a more compact configuration of the cancel mechanism 76 can be anticipated.

Further, the spring receiving member 79 is engaged with the pin 80 attached to the clutch hub 46 across the sliding hole 83 at the opposite side to the coil spring 78 with respect to the spring receiving member 79. Therefore, upon assembly, the weight member 77, coil spring 78, spring receiving member 79 and pin 80 may be assembled in order to the clutch hub 46, and the ease of assembly can be enhanced.

Further, the clutch hub 46 integrally has the plurality of spoke portions 46d and 46e extending radially in an opposing relationship to the pressure receiving plate 42, and the weight member 77 is fitted for sliding movement at a side face side of each of the spoke portions 46d selected from between the spoke portions 46d and 46e opposite to the pressure receiving plate 42. Therefore, a dead space formed between the pressure plate 45 and the clutch hub 46 can be utilized effectively to dispose the cancel mechanism 76.

While embodiments of the present invention have been described, the present invention is not limited to the embodiments described above, but allows various design changes without departing from the spirit of the present invention described in the claims.

DESCRIPTION OF REFERENCE SYMBOLS

20 . . . Main shaft which is an output power shaft
41 . . . Clutch outer
42 . . . Pressure receiving plate
43 . . . Driving friction plate
44 . . . Driven friction plate
45 . . . Pressure plate
46 . . . Clutch hub
46d, 46e . . . Spoke portion
49 . . . Thrust washer which is a locking member
62 . . . Counter torque reduction mechanism
76 . . . Cancel mechanism
77 . . . Weight member
78 . . . Coil spring which is an elastic member
79 . . . Spring receiving member
79a . . . Guide shaft portion
80 . . . Pin
81 . . . Engaging portion
82 . . . Locking portion
83 . . . Sliding hole
E . . . Internal combustion engine

The invention claimed is:

1. A clutch apparatus for a vehicle, said clutch apparatus comprising:
a clutch outer to which power from an internal combustion engine is inputted;
a pressure receiving plate fixed to an output power shaft;
a driving friction plate which is engaged by the clutch outer;
a driven friction plate disposed in an opposing relationship to the driving friction plate;
a pressure plate disposed to cooperate with the pressure receiving plate to sandwich the driving friction plate and the driven friction plate therebetween and movable in an axial direction of the output power shaft;
a clutch hub disposed between the pressure receiving plate and the pressure plate in a direction along the axial line of the output power shaft configured to be engaged by the driven friction plate;
a counter torque reduction mechanism which causes the clutch hub to press the pressure plate in a direction in which the pressure plate is spaced away from the pressure receiving plate in response to an input of rotational power from the output power shaft to the pressure receiving plate; and
a cancel mechanism which is configured to invalidate a function of the counter torque reduction mechanism in a state in which a number of rotations of the clutch hub is equal to or lower than a predetermined rotational speed, the cancel mechanism including
a weight member fitted for sliding movement in the clutch hub, and configured to slidably move in a radial direction of the output power shaft, and having an engaging portion at an inner end portion thereof along the radial direction,
an elastic member which biases the weight member toward an inner side along the radial direction of the output power shaft, and
a locking element formed on the output power shaft or a locking member fixed to the output power shaft, and configured to be engaged with the engaging portion from the opposite side to the pressure plate.

2. The clutch apparatus for a vehicle according to claim 1, wherein the engaging portion is formed as an inclined face inclined in such a manner as to be positioned on the pressure plate side toward the outer side along the radial direction of the output power shaft, and wherein the locking element is formed as a tapering face.

3. The clutch apparatus for a vehicle according to claim 1, wherein the locking member on which the locking element is formed comprises a thrust washer sandwiched between the pressure receiving plate mounted against relative rotation on the output power shaft at a fixed position in an axial direction of the output power shaft, and a nut screwed with the output power shaft.

4. The clutch apparatus for a vehicle according to claim 1, wherein the clutch hub has a sliding hole provided thereon, which extends in the radial direction of the output power shaft and in which the weight member is fitted for sliding movement, and a coil spring which is the elastic member is disposed in a compressed state between the weight member and a spring receiving member formed as a separate member from the weight member, and which is accommodated at a fixed position in the sliding hole on the outer side with respect to the weight member in the radial direction of the output power shaft, and wherein the spring receiving member has a guide shaft portion provided in a projecting manner thereon so as to be inserted into an end portion of the coil spring at a spring receiving member side.

5. The clutch apparatus for a vehicle according to claim 4, wherein the spring receiving member is engaged with a pin mounted on the clutch hub across the sliding hole at the opposite side to the coil spring with respect to the spring receiving member.

6. The clutch apparatus for a vehicle according to claim 1, wherein the clutch hub integrally has a plurality of spoke portions extending radially in an opposing relationship to the pressure receiving plate, and the weight member is fitted for sliding movement with a side face of a selected one spoke portion of the plurality of spoke portions at the opposite side to the pressure receiving plate.

7. A clutch apparatus for a vehicle, said clutch apparatus comprising:
clutch outer means for receiving power input from an internal combustion engine;
pressure receiving plate means fixed to an output power shaft, said pressure receiving plate means for receiving pressure;
driving friction plate means for being engaged by the clutch outer means;
driven friction plate means disposed in an opposing relationship to the driving friction plate means, said driven friction plate means for being driven by the driving friction plate means;
pressure plate means disposed to cooperate with the pressure receiving plate means for sandwiching the driving friction plate means and the driven friction plate means therebetween, and being movable in an axial direction of the output power shaft;

clutch hub means disposed between the pressure receiving plate means and the pressure plate means in a direction along the axial line of the output power shaft, for being engaged by the driven friction plate means;

counter-torque reduction means for causing the clutch hub means to press the pressure plate means in a direction in which the pressure plate means is spaced away from the pressure receiving plate means in response to an input of rotational power from the output power shaft to the pressure receiving plate means; and cancel means for invalidating a function of the counter-torque reduction means in a state in which a number of rotations of the clutch hub means is equal to or lower than a predetermined rotational speed, the cancel means including     weight means for sliding in the clutch hub means, and for slidably moving in a radial direction of the output power shaft, and having an engaging portion at an inner end portion thereof along the radial direction,     elastic means for biasing the weight means toward an inner side along the radial direction of the output power shaft, and     locking means formed on the output power shaft, said locking means for engaging with the engaging portion from the opposite side to the pressure plate means.

8. The clutch apparatus according to claim 7, wherein the locking means comprises a locking element formed on the output power shaft.

9. The clutch apparatus according to claim 7, wherein the locking means comprises a locking member fixed to the output power shaft.

10. The clutch apparatus according to claim 7, wherein the engaging portion is formed on an inclined face inclined in a such a manner as to be positioned on the pressure plate means side toward the outer side along the radial direction of the output power shaft, and wherein the locking means comprises a tapering face.

11. The clutch apparatus according to claim 7, wherein the locking means comprises a thrust washer sandwiched between the pressure receiving plate means mounted against relative rotation on the output power shaft at a fixed position in an axial direction of the output power shaft, and a nut screwed with the output power shaft.

12. The clutch apparatus according to claim 7, wherein the clutch hub means has a sliding hole provided thereon, said sliding hole extending in the radial direction of the output power shaft and in which the weight means is fitted for sliding movement, and wherein the elastic means comprises a coil spring means disposed in a compressed state between the weight means and a spring receiving means formed as a separate member from the weight means, and which is accommodated at a fixed position in the sliding hole on the outer side with respect to the weight means in the radial direction of the output power shaft, and wherein the spring receiving means has a guide shaft portion provided in a projecting manner thereon so as to be inserted into an end portion of the coil spring means at a spring receiving means side.

13. The clutch apparatus according to claim 12, wherein the spring receiving means is engaged with a pin mounted on the clutch hub means across the sliding hole at the opposite side to the coil spring means, with respect to the spring receiving means.

14. The clutch apparatus according to claim 7, wherein the clutch hub means comprises a plurality of spoke portions extending radially in an opposing relationship to the pressure receiving plate means, and wherein the weight means is fitted for sliding movement with a side face of a selected one spoke portion of the plurality of spoke portions at the opposite side to the pressure receiving plate means.

\* \* \* \* \*